United States Patent
Nakagawa et al.

(10) Patent No.: US 6,546,968 B2
(45) Date of Patent: Apr. 15, 2003

(54) BOND MAGNET AND MANUFACTURING METHOD THEREOF, AND ACTUATOR THEREWITH

(75) Inventors: Katsutoshi Nakagawa, Yokohama (JP); Fumiyuki Kawashima, Matsudo (JP); Takao Sawa, Yokohama (JP); Shinya Sakurada, Tokyo (JP); Tomohisa Arai, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/933,741

(22) Filed: Aug. 22, 2001

(65) Prior Publication Data

US 2002/0036558 A1 Mar. 28, 2002

Related U.S. Application Data

(62) Division of application No. 09/573,186, filed on May 19, 2000, now Pat. No. 6,317,020.

(30) Foreign Application Priority Data

May 19, 1999 (JP) .......................................... P11-138597
Dec. 20, 1999 (JP) .......................................... P11-361781

(51) Int. Cl.⁷ ............................. H01F 1/08; H01F 1/059
(52) U.S. Cl. ........................ 140/104; 148/101; 419/65
(58) Field of Search ............................... 148/101, 102, 148/103, 104; 419/65; 252/62.54

(56) References Cited

U.S. PATENT DOCUMENTS

| 4,792,367 A | | 12/1988 | Lee ........................... 148/104 |
| 4,844,754 A | | 7/1989 | Lee ........................... 148/302 |
| 4,957,668 A | * | 9/1990 | Plackard et al. ............. 148/101 |
| 4,985,072 A | | 1/1991 | Sahashi et al. ............... 75/246 |
| 5,545,266 A | * | 8/1996 | Hirosawa et al. ............ 148/302 |
| 5,549,766 A | * | 8/1996 | Tsutai et al. ................. 148/301 |
| 6,001,272 A | * | 12/1999 | Ikuma et al. ............. 252/62.54 |
| 6,221,270 B1 | * | 4/2001 | Saito et al. .................. 148/100 |

FOREIGN PATENT DOCUMENTS

| JP | 57-82445 | * | 5/1982 |
| JP | 6-172936 | | 6/1994 |
| JP | 9-074006 | | 3/1997 |
| JP | 11-293418 | | 10/1999 |

OTHER PUBLICATIONS

Fukuno et al., "Magnetic Properties of $SmFe_7N_x+\alpha Fe$ Nanocomposite Magnets and their Applications", TDK Co., 286, pp. 833–838, 1997.

* cited by examiner

Primary Examiner—John Sheehan
(74) Attorney, Agent, or Firm—Foley & Lardner

(57) ABSTRACT

A bond magnet comprises a molded body in which a mixture of flake of magnet material comprising rare earth element-iron-nitrogen as main component, $TbCu_7$ type crystal phase as a principal phase and a thickness of less than 200 µm a binder is compression molded. A compression molded body constituting a bond magnet has a density of $6\times10^3$ kg/m³ or more. In the step of compression molding a mixture of magnet material and binder, pressure is applied a plurality of times, or pressure is applied while rotating a punch and die, or the binder is cured while applying pressure to obtain such a bond magnet with good reproducibility. Such a bond magnet has excellent magnetic properties and corrosion resistance.

16 Claims, 5 Drawing Sheets

BOND MAGNET AND MANUFACTURING METHOD THEREOF, AND ACTUATOR THEREWITH

This Application is a Divisional of application Ser. No. 09/573,186, filed on May 19, 2000, now U.S. Pat. No. 6,317,020.

BACKGROUND OF THE INVENTION

1. Field of the Invention

The present invention relates to bond magnets used as high performance permanent magnets and manufacturing methods thereof, and actuators therewith such as motors.

2. Description of the Related Art

So far, as one kind of high performance permanent magnets rare earth system magnets such as Sm—Co system magnets and Nd—Fe—B system magnets are well known. A large amount of Fe and Co in these magnets contributes to increase saturation magnetic flux density. The rare earth elements such as Nd and Sm, due to a behavior of 4f electrons in a crystal field, cause very large magnetic anisotropy. Thereby, coercive force is increased.

The rare earth magnets of high performance are employed in electrical appliances mainly such as motors and measuring instruments. Recently, in order to cope with demands for smaller sizes and lower prices of various kinds of electrical appliances, permanent magnets of higher performance are in demand. In particular, in medium driving spindle motors used in hard disk drives (HDDs), floppy disk drives (FDDs), CD-ROM drives and DVD drives and actuators for driving light pick-ups used in CD-ROM drives and DVD-drives, in realizing smaller size and higher performance, further improved permanent magnet is in demand.

To the demands for permanent magnets such as described above, for instance R—Zr—(Fe, Co)—N system magnet material (R: rare earth elements) of which principal phase is $TbCu_7$ type crystal structure is proposed (cf. Japanese Patent Laid-Open Application (KOKAI) No. HEI 6-172936 and others). A permanent magnet using such magnet material is in general a bond magnet constituted of for instance a molded body (compression molded body) that is obtained by compression-molding a mixture of magnet powder and resin-based binder into a molded body. The mixture of the magnet powder and the resin-based binder is press-formed by use of a press machine of general use.

Magnetic performance of the bond magnet such as described above, residual magnetization and maximum magnetic energy product $((BH)_{max})$ in particular, is determined by magnetic properties of the magnet material being used and density of the molded body (compression molded body) constituting the bond magnet. That is, when the magnet material of equivalent performance being used, by increasing the density of the molded body, the bond magnet can be made higher performance. When the density of the molded body is increased to decrease voids, corrosion-resistance of the bond magnet is also expected to improve.

However, in a manufacturing method of the bond magnet therein an existing general press forming is applied, there is a limit in an improvement of the density of the compression molded body consisting of the mixture of the magnet powder and the binder. In particular, as in the magnet material of which principal phase is $TbCu_7$ type crystal phase, when flakes (or a ribbon) of magnet material obtained by quenching are used, during press forming, there occurs friction or spring back between magnet materials. Thereby, the compression-molded body is hindered from being densified. Accordingly, the bond magnet is in a situation difficult to further improve performance due to an improvement of the density of the molded body.

SUMMARY OF THE INVENTION

Accordingly, an object of the present invention is to provide a bond magnet in which a density of molded body of bond magnet is further increased to improve magnetic properties such as the maximum magnetic energy product, further corrosion-resistance. Here, in the bond magnet, magnet material of which principal phase is $TbCu_7$ crystal phase is used. Another object of the present invention is to provide a manufacturing method of bond magnets that enable to increase the density of the molded body with ease and reproducibility. Still another object of the present invention is to provide an actuator that is, by using bond magnet having the aforementioned characteristics, made smaller in size and higher in performance.

The present inventors studied hard to achieve the aforementioned objects. As a result, it was found that in manufacturing a molded body by compression-molding a mixture of magnet material and binder, by controlling conditions of press forming and shape of the molded body, the density of the molded body can be further increased.

That is, at first pressing, the mixture of the magnet material and the binder is low in fluidity to cause a large fluctuation in microscopic density. By contrast, when pressure is lowered once during compression molding, in the form of spring back the fluctuation of local residual stress is released. Simultaneously, microscopic movement of the magnet material broken during compression and the binder occurs. When the mixture in such a state is pressed again, the magnet material and the binder move so as to more homogenize internal stress to result in a decrease of microscopic fluctuation of the density within the molded body. Based on these, since press power during the compression molding can be more effectively utilized, the voids in the molded body (bond magnet) are decreased to enable to improve the density.

During compression molding, by applying pressure while rotating or reciprocating a forming mold such as a punch or a die, the density of the molded body also can be increased. Since rotary or reciprocating motion of the forming mold applies shearing stress or the like to the mixture, the mixture is more positively forced to flow. Accordingly, further densification of the bond magnet can be realized. Further, by curing the binder while applying pressure to the mixture, the bond magnet can be more densified.

Further, by optimizing the shape of the molded body, the density of the bond magnet can be easily increased. For instance, a ring of the bond magnet, by making appropriate a ratio of a thickness and a height of the ring portion or the specific value of a thickness, the density of the molded body can be further increased with ease. For the bond magnet formed in disk or a rectangular plate, a reduction of the thickness to less than an appropriate value is effective.

The present invention is accomplished based on such knowledge. The bond magnet of the present invention is one comprising a molded body in which the mixture containing magnet material of which main component is rare earth element-iron-nitrogen and a binder is formed into a magnet shape. The magnet material comprises $TbCu_7$ crystal phase as a principal phase and a shape of flake of a thickness of less than 200 μm, the molded body thereof having a density of $6 \times 10^3$ $kg/m^3$ (6 $g/cm^3$) or more. In the bond magnet of the present invention, the density of the molded body is preferable to exceeds $6.1 \times 10^3$ kg/m$^3$ (6.1 g/cm$^3$).

The present invention, when as the flakes of magnet material one that is obtained by incorporating nitrogen in an alloy ribbon consisting of a quenched body of molten alloy is used and a thickness thereof is in the range of 5 to 50 μm, is particularly effective. The flakes of magnet material are preferable to comprise TbCu$_7$ crystal phase of which average grain diameter is in the range of 5 nm or more and less than 50 nm as a principal phase. Thus, by employing the flakes of magnet material which comprises fine TbCu$_7$ crystal phase as a principal phase, magnetic properties of the bond magnet can be further improved.

In the present bond magnet, the kind of the binder is not particularly restricted. However, the present invention is particularly effective for the bond magnet that uses resin-based binder. The content of the resin-based binder is preferable to be in the range of 0.5 to 5% by mass to magnet material. The present bond magnet comprises a compression-molded body of the mixture of for instance the flakes of magnet material and the binder.

A first method for manufacturing the bond magnet of the present invention is one for manufacturing the bond magnet that comprises a step of compression-molding a mixture of magnet material and binder into a desired magnet shape. In the step of compression molding, the pressure is applied to the aforementioned mixture a plurality of times.

The first method for manufacturing the bond magnet is characterized in that in more specifically in the step of compression molding, between a maximum pressure and 90% or less thereof, compression and decompression to the mixture are alternately repeated. Further, in the step of compression molding, a procedure comprising a step of applying the pressure of $6 \times 10^2$ MPa or more to the mixture and a step of releasing the pressure by decreasing the pressure by $2 \times 10^2$ MPa or more is preferably repeated twice or more.

A second method for manufacturing the bond magnet of the present invention is characterized in that, in the method for manufacturing the bond magnet comprising a step of compression molding the mixture of the magnet material and the binder into the desired magnet shape, in the aforementioned step of compression molding, while rotating or reciprocating at least one selected from a punch and die for compression molding, the pressure is applied to the mixture.

A third method for manufacturing the bond magnet is characterized in that, in the method of manufacturing the bond magnet comprising a step of compression molding the mixture of the magnet material and the binder into the desired magnet shape, in the step of compression molding, while applying the pressure to the mixture, the binder is cured.

The present methods for manufacturing the bond magnets are particularly effective when the bond magnets are produced with flakes of magnet material of which main component is rare earth element-iron-nitrogen and principal phase is TbCu$_7$ crystal phase as the magnet material and with resin-based binder as the binder. In addition, when a thickness of the flakes of magnet material is less than 200 μm, the present methods are effective. The present manufacturing method is also applicable to manufacture of bond magnets that employ other magnet material, contributing in increasing the density of the molded body. As the other magnet material, for instance magnet materials comprising Th$_2$Ni$_{17}$ crystal phase, Th$_2$Zn$_{17}$ crystal phase or R$_2$Fe$_{14}$B crystal phase (R: rare earth element such as Nd) as principal phase can be cited.

An actuator of the present invention comprises the bond aforementioned magnet of the present invention. The present actuator described above comprises the present bond magnet for instance and means for operating a moving body with magnetic force of the bond magnet as driving force. Such actuators of the present invention are suitable for various kinds of actuators to which the smaller size and higher performance are demanded. The suitable examples of actuators are medium driving spindle motors used in HDDs, FDDs, CD-ROMs, DVDs and the like, motors for printers, vibration generating pager motors of such as portable telephones, lens actuators of optical pick-ups, actuators of automobile speed meters, linear actuators, and various kinds of magnet rolls. The bond magnets of the present invention also can be used as magnets for speakers of higher sound quality and thinner thickness used in portable telephones.

DESCRIPTION OF THE PREFERRED EMBODIMENTS

Figure 1:
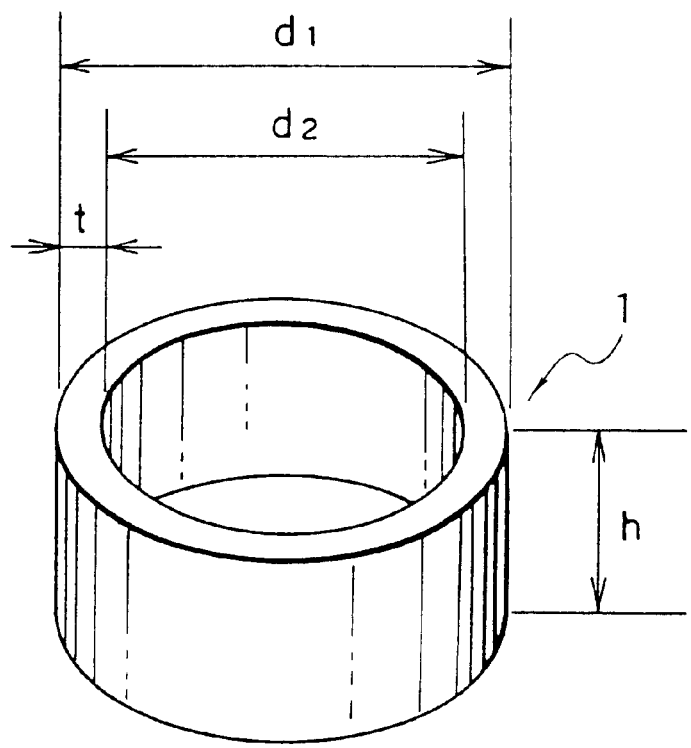
FIG. 1 is a perspective view showing one example of a shape suitable for a bond magnet of the present invention.

In the following, modes for implementing the present invention will be explained.

A bond magnet of the present invention comprises a molded body (compression molded body) that is obtained by forming a mixture of magnet material and binder into a desired magnet shape. Here, the magnet material comprises rare earth element-iron-nitrogen as main components and TbCu$_7$ type crystal phase as a principal phase. As the magnet material, one in flakes of a thickness of less than 200 μm is used. The molded body constituting such a bond magnet possesses a density of $6 \times 10^3$ kg/m$^3$ or more.

In the bond magnet in which flakes of magnet material of which principal crystal phase is TbCu$_7$ crystal phase and thickness is less than 200 μm are used, the density of $6 \times 10^3$ kg/m$^3$ or more can be realized with reproducibility through optimization of the shape of the molded body or control of conditions during compression-molding. In the present invention, through the control of the press conditions, the bond magnet that has the density of molded body of $6.1 \times 10^3$ kg/m$^3$ or more can be obtained.

According to the bond magnet constituted of the aforementioned compression-molded body of high density, when magnet material of the same performance is used, the residual magnetization in particular can be increased to result in an increase of a maximum magnetic energy product ($(BH)_{max}$). Further, due to a decrease of voids resulting from an increase of the density of the molded body, corrosion-resistance of the bond magnet can be increased. In particular, when the density of the molded body exceeds $6.1 \times 10^3$ kg/m$^3$ or more, magnetic properties such as $(BH)_{max}$ can be further increased.

The density of the bond magnet is obtained by accurately measuring the shape thereof to obtain a volume and by measuring mass thereof with a balance of high precision. A surface portion of the bond magnet thereon rust preventive coating is applied has to be removed. Accordingly, by cutting into a shape by which accurate measurement of dimension can be done, the cut out body can be evaluated. The measurement can be carried out due to Archimedes's principle.

The magnet material used in the present bond magnet comprises rare earth element-iron-nitrogen as main components and TbCu$_7$ phase as a principal crystal phase. As such magnet material, for instance, one having a composition expressed substantially by $$\text{General formula: } \{(R^1_x R^2_{1-x})_Y B_Z T_{1-Y-Z}\}_{1-Q} N_Q \qquad (1)$$

(in the formula, $R^1$ indicates at least one kind of element selected from rare earth elements, $R^2$ at least one kind of element selected from Zr, Hf and Sc, T at least one kind of element selected from Fe and Co, and X, Y, Z and Q are numbers in terms of atomic ratio satisfying respectively $0.2 \leq X \leq 1$, $0.04 \leq Y \leq 0.2$, $0 \leq Z \leq 0.1$, and $0.01 \leq Q \leq 0.2$) and comprising TbCu$_7$ crystal phase as the principal phase can be cited.

In the aforementioned formula (1), the $R^1$ element causes a large magnetic anisotropy to the magnet material to result in high coercive force. As such $R^1$ elements, rare earth elements such as La, Ce, Pr, Nd, Sm, Eu, Gd, Tb, Dy, Ho, Er, Tm, Lu and Y can be cited. Among these, in particular more than 50% of the $R^1$ element is preferable to be Sm. Thereby, the magnetic anisotropy of the principal phase can be increased to result in an increase of the coercive force.

The $R^2$ element is at least one kind of element selected from Zr, Hf and Sc. Such $R^2$ element occupies mainly rare earth sites of the principal phase and has an effect to reduce an average atomic radius of the rare earth sites. Thereby, the TbCu$_7$ type crystal phase can be promoted to grow, and the concentration of Fe or Co in the TbCu$_7$ type crystal phase can be increased. Further, the $R^2$ element, when manufacturing the magnet material through quenching method or the like, promotes to become amorphous during quenching, further to be finer grains after heat treatment. These contribute in an improvement of magnetic properties. The $R^2$ element prevents α-Fe phase from precipitating in the magnet material to result in showing also an effect of improving the magnetic properties.

In the formula (1), a sum Y of $R^1$ and $R^2$ elements is preferable to be in the range of $0.04 \leq Y \leq 0.2$, being more preferable to be in the range of $0.05 \leq Y \leq 0.15$. This is because due to a larger sum Y of $R^1$ and $R^2$ elements a larger magnetic anisotropy can be obtained to result in giving higher coercive force. However, the $R^1$ and $R^2$ elements, when compounded too much, are likely to cause deterioration of the magnetization.

The ratio of the $R^1$ element to the sum of the $R^1$ and $R^2$ elements is preferable to be in the range of $0.2 \leq X \leq 1$. When the content of the $R^1$ element is extremely reduced, the magnetic anisotropy decreases remarkably to cause a difficulty in obtaining magnet material of large coercive force. Accordingly, the ratio X of the $R^1$ element is preferable to be 0.2 or more. In addition, since the larger ratio X of the $R^1$ element is advantageous in obtaining the higher coercive force, the value of X is preferable to be 0.5 or more. However, when the ratio of the $R^1$ element is made extremely large, α-Fe phase is caused to precipitate. Accordingly, the value of X is preferable to be 0.95 or less. The value of X is more preferable to be in the range of $0.65 \leq X \leq 0.85$.

B (boron) is an element, due to making amorphous during quenching and making finer grains after heat treatment, effective in improving residual magnetization and preventing α-Fe phase from precipitating. Though an addition of B can bring about preferable properties, B is not necessarily required to compound in the magnet material used in the present invention. When boron is compounded in excess, during the step of heat treatment, R$_2$Fe$_{14}$B phase is conspicuously formed to be liable to cause a deterioration of magnetic properties of the magnet material. Accordingly, the content Z when the boron is added is preferable to be 0.1 or less. Thus, the content Z of boron is in the range of $0 \leq Z \leq 0.1$. The content of boron is more preferable to be in the range of $0.001 \leq Z \leq 0.1$, being further more preferable to be in the range of $0.001 \leq Z \leq 0.05$.

The T element is at least one kind of element selected from Fe and Co, having a function of increasing the saturation magnetization of the magnet material. The increase of the saturation magnetization accompanies an increase of the residual magnetization to result in an increase of the maximum magnetic energy product. Such T element is preferable to incorporate 70% or more in the magnet material, thereby being able to effectively increase the saturation magnetization. In further increasing the saturation magnetization of the magnet material, the Fe content occupying in the total amount of the T element is preferable to be 50 atomic % or more.

Part of the T element may be replaced by at least one kind of element (hereinafter referred to as M element) selected from Ti, Cr, Cu, Mo, W, Mn, Ga, Al, Sn, Ta, Nb, Si and Ni. By replacing the part of the T element with such an M element, various characteristics important in practical use such as corrosion resistance and heat resistance can be improved. When the T element is extremely replaced by the M element, magnetic properties are remarkably deteriorated. Accordingly, an amount of replacement of the T element by the M element is preferable to be 20 atomic % or less.

N (nitrogen) exists mainly in the interstices of the lattice of the principal phase to improve Curie temperatures and magnetic anisotropy of the principal phase in comparison with the case of nitrogen being not contained. Among these, the improvement of the magnetic anisotropy is important in giving a large coercive force to the magnet material. Though a small amount of N exhibits an effect, when added in excess, α-Fe phase precipitates much. Accordingly, the content Q of the N is preferable to be in the range of $0.01 \leq Q \leq 0.2$, more preferable to be in the range of $0.02 \leq Q \leq 0.2$, further more preferable to be in the range of $0.1 \leq Q \leq 0.2$, still further more preferable to be in the range of $0.11 \leq Q \leq 0.18$.

Part of N can be replaced by at least one kind of element (hereinafter referred to as X element) selected from C and P. Thereby, magnetic properties such as the coercive force can be improved. When an amount of replacement of N by the X element is too much, an effect of improving the Curie temperatures and the magnetic anisotropy of the principal phase is lowered. Accordingly, the amount of replacement of N by the X element is preferable to be 50 atomic % or less.

The magnet material substantially expressed by the formula (1) permits to contain an avoidable impurity such as oxide or the like. The principal phase (TbCu$_7$ type crystal phase) in the magnet material indicates one of which volume ratio in constituent phases including an amorphous phase in an alloy is the largest. In the present invention, the principal phase is preferable to be contained 50% or more by volume ratio. Further, from a viewpoint of magnetic properties, the TbCu$_7$ type crystal phase is preferable to be contained 80% or more by volume ratio. The crystal structure can be easily confirmed by use of X-ray diffraction or the like.

By the way, depending on the conditions of heat treatment for crystallization that will be later described, a soft magnetic phase that is substantially consisting of Fe or Co such as α-Fe phase may precipitate. However, the soft magnetic phase of fine grains of which average grain diameter is for instance 50 nm or less contributes in improving the residual magnetization. However, the ratio of the soft magnetic phase such as α-Fe phase is preferable to be 20% or less by volume ratio. When the average grain diameter of the soft magnetic phase exceeds 50 nm or the volume ratio of the soft magnetic phase exceeds 20% by volume ratio, the coercive force is remarkably lowered.

The present invention exhibits an effect in particular when flakes of magnet material of which thickness is less than 200 μm are used. That is, the flakes of magnet material of which thickness is less than 200 μm are large in spring back in manufacturing the bond magnet to be extremely difficult to sufficiently increase the density of the molded body due to the ordinary press forming. According to the present invention, the density of the bond magnet in which such flakes of magnet material are used can be increased to such a high density as 6×10$^3$ kg/m$^3$ or more with good reproducibility.

The flakes of magnet material of which thickness is less than 200 μm can be manufactured by ejecting master alloy in for instance a molten state onto a coolant to quench. That is, an alloy ingot or the like of which composition is substantially expressed by $$\text{General formula: } (R^1{}_X R^2{}_{1-X})_Y B_Z T_{1-Y-Z} \quad (2)$$

(in the formula, R$^1$ denotes at least one kind of element selected from rare earth elements, R$^2$ at least one kind of element selected from Zr, Hf and Sc, T at least one kind of element selected from Fe and Co, and X, Y and Z are numbers in terms of atomic ratio satisfying respectively 0.2≦X≦1, 0.04≦Y≦0.2 and 0≦Z≦0.1. Part of T element (for instance 20 atomic % or less) may be replaced by at least one kind of M element selected from Ti, Cr, Cu, Mo, W, Mn, Ga, Al, Sn, Ta, Nb, Si and Ni) is prepared by use of arc melting or high frequency melting.

Such master alloy, after melting, is ejected onto a coolant moving with high speed such as a single roll or a twin roll to quench. Thereby, flakes (or ribbon) of alloy material of which principal phase is TbCu$_7$ type crystal phase, or flakes of alloy material that is made amorphous are manufactured. In the present invention, it is preferable, by applying heat-treatment to the alloy material that is made amorphous in particular to crystallize, to obtain the flakes of alloy material of which principal phase is TbCu$_7$ crystal phase. According to such heat treatments, the grain diameter of the TbCu$_7$ type crystal phase can be made finer and more homogeneous to result in enabling to improve the magnetic properties.

The aforementioned heat treatment is preferable to implement in an atmosphere of an inert gas for instance such as Ar or a vacuum under the conditions of a temperature in the range of 300 to 1200° C. and a time of 0.1 to 200 hours. In this case, depending on the conditions of heat treatment, the α-Fe phase may precipitate to cause deterioration of the magnetic properties. However, when the grain diameter of the soft magnetic phase such as the aforementioned α-Fe phase is sufficiently fine, there is a chance where the magnetic properties can be improved on the contrary.

Next, the aforementioned flakes of alloy material are heat-treated in an atmosphere containing nitrogen to nitride. Thereby, the flakes of magnet material of which principal phase is the intended TbCu$_7$ type crystal phase can be obtained. The heat-treatment for nitriding is preferable to implement in an atmosphere of nitrogen gas of 0.01 to 10 atmospheric pressure under a temperature of 400 to 500° C. The nitriding treatment under such conditions is preferable to implement for a time of 0.1 to 300 hours.

The atmosphere during nitriding treatment, instead of nitrogen gas, can be a nitrogen compound gas such as ammonia gas or the like. When the ammonia gas is used, the rate of nitriding reaction can be increased. At this time, by using together such gases as hydrogen, nitrogen, argon or the like, the rate of nitriding reaction can be controlled. By pulverizing the aforementioned alloy material preceding the nitriding treatment, the rate of nitriding reaction can be increased. However, excess pulverization brings about much fine powder to tend to cause deterioration of magnetic properties.

In the flakes of magnet material used in the present invention, an average diameter of grains of TbCu$_7$ type crystal phase is preferable to be in the range of 5 nm or more and less than 50 nm. By making fine the TbCu$_7$ type crystal phase (grains), the magnet material of high residual magnetization, high (BH)$_{max}$ and high coercive force can be obtained. When the average grain diameter of the TbCu$_7$ type crystal phase is less than 5 nm, the coercive force of the magnet material decreases. On the other hand, when the average grain diameter is more than 50 nm, an increase in the residual magnetization and resultant increase of (BH)$_{max}$ can not be sufficiently obtained. The average grain diameter of TbCu$_7$ type crystal phase is further preferable to be in the range of 10 to 45 nm.

An average grain diameter of a hard magnetic phase is obtained in the following way. In a photograph (photograph of agglomerates of fine grains) of one field of view obtained by TEM observation, each grain is checked whether it is a TbCu$_7$ type crystal phase or not. For each grain that is confirmed to be TbCu$_7$ crystal phase, grain diameter thereof is measured. Among these grain diameters, with maximum and minimum values, an average grain diameter is obtained. Such measurements are implemented in ten fields of view to average these values to obtain an average grain diameter of hard magnet material. Instead, from the half-value width of X-ray diffraction, by use of Scherrer's equation, the average grain diameter can be obtained. The average grain diameter of the aforementioned soft magnetic phase is obtained from a photograph of one field of view obtained by TEM observation as identical with the case of the hard magnetic phase. After checking whether each grain is bcc phase (Fe or FeCo) or not, each grain that is confirmed to be the bcc phase is measured of the grain diameter. An average value is obtained by averaging the minimum and maximum values of grain diameters. An area of the TbCu$_7$ type crystal phase or Fe or FeCo phase in one field of view is obtained by image processing to regard as an area ratio. The area ratio is taken in two or more fields of view, followed by averaging to obtain a volume %.

A thickness of the flake of magnet material obtained by the quenching method such as mentioned above is made less than 200 μm. When the thickness exceeds 200 μm, the effect of the present invention can not be fully exhibited but also the grain diameter of the $TbCu_7$ type crystal phase becomes coarse to cause deterioration of the magnetic properties. The thickness of the flake of magnet material is more preferable to be 150 μm or less, being still further preferable to be in the range of 5 to 50 μm. By adjusting the thickness of flakes as described above, the grain diameter of the $TbCu_7$ type crystal phase can be made fine with reproducibility. In addition, the flake of magnet material of which thickness is in the range of 5 to 50 μm is large in the spring back in manufacturing in particular the bond magnet. Accordingly, the bond magnet due to the present invention can be effectively densified.

The thickness of magnet material is measured in the following ways. In one method, a sample of a thin ribbon obtained by quenching, after measuring a width and length thereof, is measured of its mass to calculate the thickness by use the previously measured density. In the other method, the thickness is obtained from a photograph of a cross section of the bond magnet. The magnet material, when being in flakes, can be measured by use of a ballpoint micrometer. In this case, measurements are made at more than ten points and the obtained values are averaged to obtain the thickness. In particular, in a sample of which thickness is relatively thin, for instance 100 μm or less, when quenched with a single roll, both sides of a surface in contact with the roll and a freely solidified surface tend to remain in approximately flat. By evaluating of this portion, an accurate thickness can be obtained.

The aforementioned magnet material and binder are mixed, the mixture being compression-molded into a desired magnet shape to obtain a molded body constituting the present bond magnet. The binder used for manufacturing the bond magnet is not particularly restricted, ordinary resin based binder or metal binder being used. The present invention is particularly effective in the bond magnet that uses the resin-based binder.

For the resin-based binder, various kinds of resins such as for instance epoxy-, nylon-, polyamide-, polyimide- or silicone-based resin can be used. In particular, epoxy-based resin is suitable. When heat resistance is necessary, polyamide- or polyimide-based resin is preferably used. Though the resin being used can be in any form of powder, liquid-or mixture thereof, in particular the liquid resin is preferably used to obtain the high density. The viscosity of the liquid resin is preferable to be in the range of 1 to 500 poise.

The aforementioned resin-based binder is preferable to be contained in the range of 0.5 to 5% by mass with respect to the magnet material. When an amount of the binder exceeds 5% by mass, the magnetic properties of the bond magnet deteriorates. When applying the manufacturing method of the bond magnet of the present invention, only a small amount of binder can sufficiently adhere between the magnet materials to enable to obtain the bond magnet of necessary strength. However, when the amount of binder is less than 0.5% by mass, the magnet materials are liable to be poorly adhered. The amount of the binder is preferable to be in the range of 1 to 3% by mass, being more preferable to be in the range of 1.5 to 2.5% by mass.

To the present bond magnet, titanate-, silane-based coupling agent or the like can be added. The coupling agent improves dispersion of powder to be effective in an increase of the density of magnet. When the surface of the magnet powder is treated by lubricant such as fatty acid, salts of fatty acid, amines, or the like, the aforementioned spring back is suppressed to contribute in an improvement of the density of the bond magnet. Further, with respect to an improvement of the density of the bond magnet, it is effective to give an appropriate distribution to the particle diameter of magnet powder.

In the present bond magnet, the density of molded body of $6 \times 10^3$ kg/m$^3$, further that exceeding $6.1 \times 10^3$ kg/m$^3$ is realized based on the manufacturing method described later in detail. The shape of the bond magnet also affects on the density of the molded body. Accordingly, in the present bond magnet, the shape shown in the following is preferable to apply. Thereby, the aforementioned density of molded body can be realized with reproducibility.

That is, a ring of bond magnet 1 as shown in FIG. 1 is preferable to be an external diameter d1 of 30 mm or less, an internal diameter d2 of 0.1 mm or more and a height h of 20 mm or less. The external diameter d1 is more preferable to be 20 mm or less. Further, a thickness t of the ring portion is preferable to be 6 mm or less. The thickness t is more preferable to be 4 mm or less. As to the relationship between the thickness t and height h, a shape of which ratio thereof (h/t) is in the range of 0.1 to 20 is preferable. According to such a ring, the flakes of magnet material of which thickness is less than 200 μm (in particular, of a thickness of 5 to 50 μm) spring back with difficulty. Accordingly, the bond magnet is densified with ease.

The ring of bond magnet can be, other than one of which thickness is constant, one of which thickness is uneven. As such a shape, for instance, one of which external diameter side is circular and internal diameter side is polygonal (for instance, hexagonal) can be cited. Further, a cross section of the bond magnet may be formed in a multistage in a direction of height.

Figure 2:
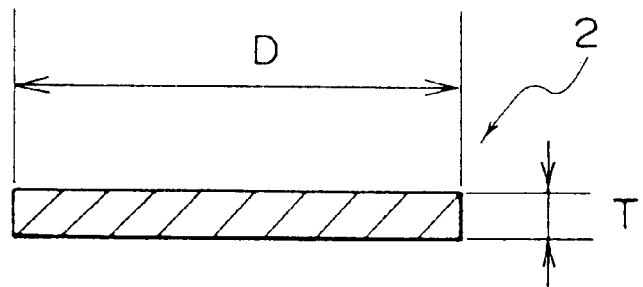
FIG. 2 is a cross section showing another example of a shape suitable for a bond magnet of the present invention.

In a planar bond magnet 2 as shown in FIG. 2, a thickness (a thickness of a plate) T is preferable to be 6 mm or less, being more preferable to be 4 mm or less. With such a shape, the flakes of magnet material can be effectively suppressed from causing the spring back. A specific shape of the planar bond magnet may be formed circular or rectangular. An external length D (a length of a diagonal in case of being a rectangular plate) of a disc of bond magnet is not particularly restricted. However, as identical with the case of being a ring, a shape of which ratio between the thickness T and the external length D (D/T) is in the range of 0.1 to 20 is preferably selected. The preferable external length D of the disk of bond magnet is 25 mm or less.

Next, modes for implementing the manufacturing methods of bond magnets of the present invention will be described.

First, the magnet material and resin-based or metal binder described above are mixed. The magnet material is usually used after pulverization. When being already pulverized during a manufacturing step of the magnet material, the above step can be omitted. As the resin-based binder, the aforementioned various kinds of binders can be used. The compounding amount of the binder is as mentioned above. When the metal bond magnets are manufactured, for the binder, low-melt metal or low-melt alloy is used. As specific examples of the metal binder, Al, Pb, Sn, Zn, Cu, Mg, Ga and alloys including these can be cited.

Here, as the magnet material thereto the present manufacturing methods can be applied, first of all the magnet material of which principal phase is the aforementioned $TbCu_7$ type crystal phase can be cited. The present manufacturing method, however, without restricting thereto, can be applied to Nd—Fe—B system magnet material or also to rare earth system magnet materials of which principal phase, other than $TbCu_7$ type crystal phase, is one of for instance $Th_2Ni_{17}$, $Th_2Zn_{17}$ and $ThMn_{12}$ type crystal phases. These magnet materials can be obtained by controlling for instance the composition in the aforementioned formula (1) or conditions of manufacturing the magnet materials.

In addition, the shape of the magnet material is neither necessarily restricted. The present manufacturing method, without restricting to the flake of magnet material, can be applied to powder or cake of magnet material. From a viewpoint of removing a factor that reduces the density due to the spring back to attain densification of the bond magnet, it is particularly effective when the flake of magnet material of which thickness is less than 200 μm is used. Further, when the flake of magnet material of a thickness of 5 to 50 μm that is large in spring back is used, the present invention exhibits more larger effects.

Next, the mixture of the aforementioned magnet material and binder is compression molded into a desired magnet shape to obtain a compression molded body constituting the bond magnet. The compression molding of the mixture is implemented by use of a press machine for forming. In this case, one of the condition controls shown in the following (A) to (C) is applied. A combination thereof can be applied. By implementing the press controls shown in (A) to (C), the density of the bond magnet can be easily densified with reproducibility.

(A). Pressure is applied a plurality of times to the mixture of the magnet material and binder.

(B). In compression-molding the mixture of the magnet material and binder, with at least one selected from a punch and a die rotating or reciprocating, the pressure is applied to the mixture.

(C). In compression-molding the mixture of the magnet material and binder, while applying the pressure to the mixture, the binder is cured.

First, the control of the press conditions of (A) will be explained in detail. That is, in the step of press forming the mixture of the magnet material and binder, between a maximum pressure and a pressure that is 90% or less of the maximum pressure, compression and decompression to the mixture are alternately repeated a plurality of times. In more specific, in the step of press forming the mixture, with the procedures of (a) and (b) shown in the following as one step, this step is preferably repeated twice or more.

(a). Pressure of $6 \times 10^2$ MPa or more ($P_1$: a maximum pressure) is applied to the mixture of the magnet material and binder.

(b). Subsequently, the pressure is lowered to the pressure ($p_2$) that is lower by $2 \times 10^2$ MPa than the maximum pressure $P_1$ that is applied in (a).

That is, after the maximum pressure (for instance, pressure $P_1$ of $6 \times 10^2$ MPa or more) is applied to the mixture, the pressure is once lowered to 90% or less of the maximum pressure, further to the pressure $P_2$ ($\leq P_1 - 2 \times 10^2$ MPa). In other words, in the course of the step of press forming, the pressure is released a certain degree. Thereby, the friction or spring back between the magnet materials that hinders densification can be cancelled. Thereafter, the maximum pressure $P_1$ is applied again, thereby enabling to apply effective pressure to the magnet material. Through such operations, the magnet material is appropriately broken to enable to realize densification of the bond magnet.

The maximum pressure $P_1$, though depending on the shape and kind of the magnet material, is preferable to be $6 \times 10^2$ MPa or more. When the maximum pressure $P_1$ is less than $6 \times 10^2$ MPa, the molded body may not be sufficiently densified. The maximum pressure $P_1$ in the step of pressure application of (a) is more preferable to be $8 \times 10^2$ MPa or more.

On the other hand, in the step of pressure release of (b), the pressure is preferable to be lowered to that of 90% or less of the maximum pressure $P_1$. When the pressure during pressure release exceeds 90% of the maximum pressure $P_1$, the spring back cancellation effect accompanying the pressure release can not be sufficiently obtained. During the step of pressure release, it is further preferable to lower the pressure by $2 \times 10^2$ MPa or more from the maximum pressure $P_1$.

The pressure $P_2$ in the step of pressure release is preferable to be $2 \times 10^2$ MPa or less particularly in terms of an absolute value of the pressure. Thereby, an effect of cancellation of the friction and spring back between magnet materials can be more effectively exhibited. The pressure $P_2$ in the step of pressure release is preferable to be approximately zero (state of atmospheric pressure) from a viewpoint of improvement of the density. In the present invention, however, the aforementioned step consisting of procedures of (a) and (b) is repeated twice or more. Accordingly, considering a shift towards the following step of pressure application, a certain degree of pressure is preferable to be maintained. Thereby, formability of the bond magnet can be prevented from lowering.

Number of repetition of the step consisting of (a) and (b) procedures is particularly preferable to be five times or more. According to such press operations, the bond magnet that is further densified can be obtained with good reproducibility.

Next, the press condition control of (B) will be described in detail. That is, in a state where pressure is applied to the mixture of the magnet material and binder, a press mold (punch and die) is rotated so as to apply torsional stress to the mixture, or is reciprocated so as to apply shearing stress to the mixture. Thereby, the friction or spring back between the magnet materials that is a factor hindering densification can be cancelled to enable to densify the bond magnet.

FIGS. 3 to 8 show specific constitutions of the control of press conditions of (B), respectively. In these figures, reference numerals 11, 12, 13, 14 and 15 denote the mixture (forming material of the bond magnet) of the magnet material and binder, die, upper punch, lower punch and center punch, respectively.

Figure 3:
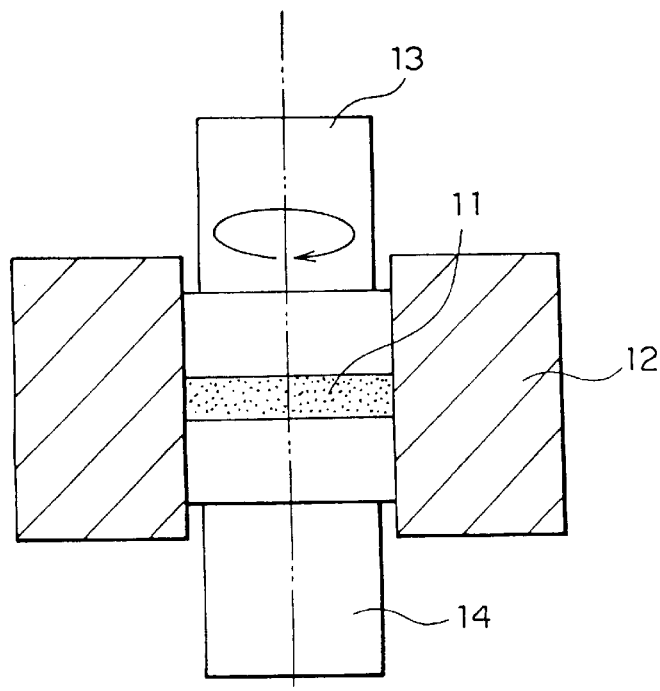
FIG. 3 is a diagram for explaining a first embodiment of a second manufacturing method of the present invention.
Figure 4:
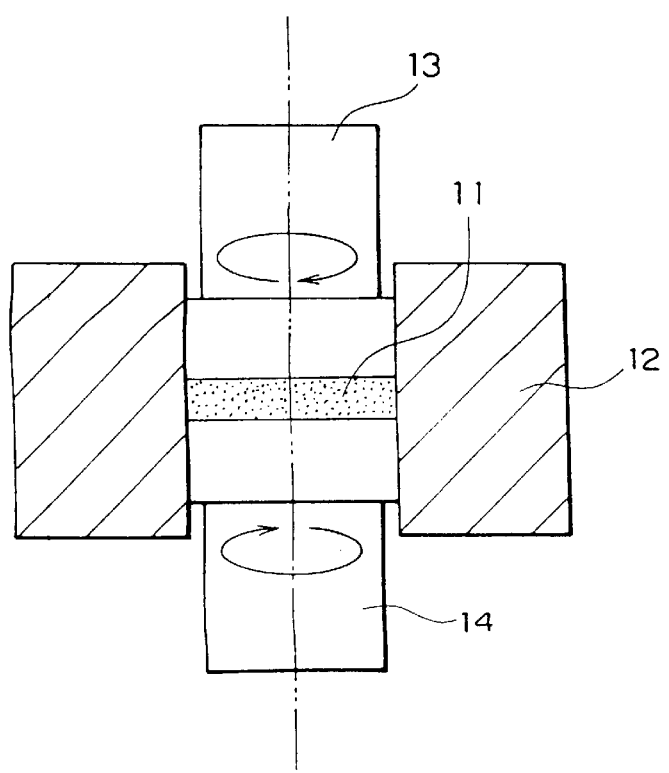
FIG. 4 is a diagram showing a modified example of the embodiment of the manufacturing method of the bond magnet shown in FIG. 3.

For instance, in the step of press molding of the mixture 11, as shown in FIG. 3, the upper punch 13 is rotated, or as shown in FIG. 4, the upper and lower punches 13 and 14 are rotated in directions opposite to each other. That is, the upper and lower punches 13 and 14 are rotated relatively with respect to a center axis so as to apply torsional stress. Such a step of pressing is effective in forming a disk of magnet of a thickness of 6 mm or less (further 4 mm or less, still further 2 mm or less) and a ring of magnet of which thickness in a direction of diameter is larger than a height thereof.

Figure 5:
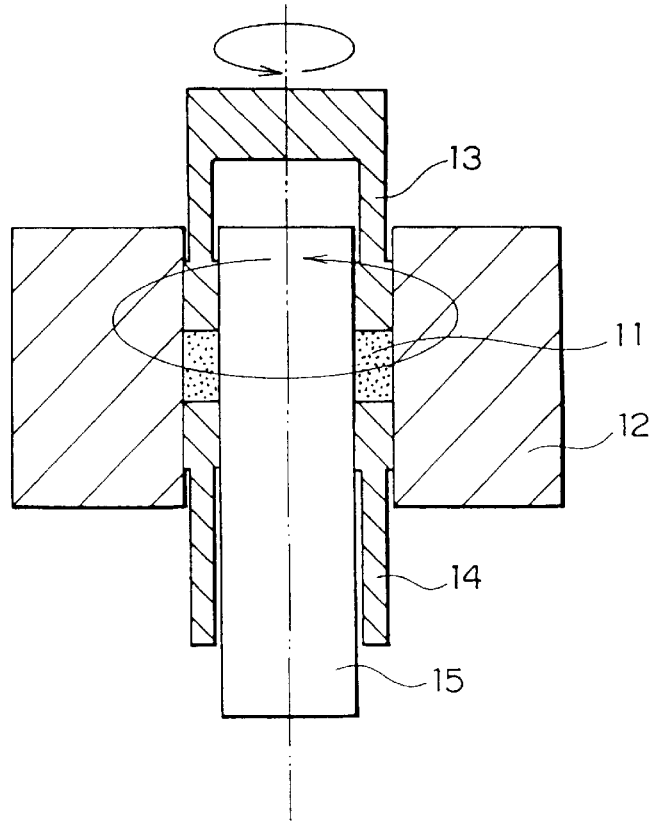
FIG. 5 is a diagram for explaining a second embodiment of the second manufacturing method of the present invention.

As shown in FIG. 5, the die 12 and upper punch 13 (or the lower punch 14) are rotated relatively with respect to the center axis so as to apply torsional stress. Such a step of pressing is effective in forming a disk of magnet of a thickness of 5 mm or less (further 3 mm or less, still further 1.5 mm or less), or a ring of magnet of which thickness in a direction of diameter is larger than the height.

Figure 6:
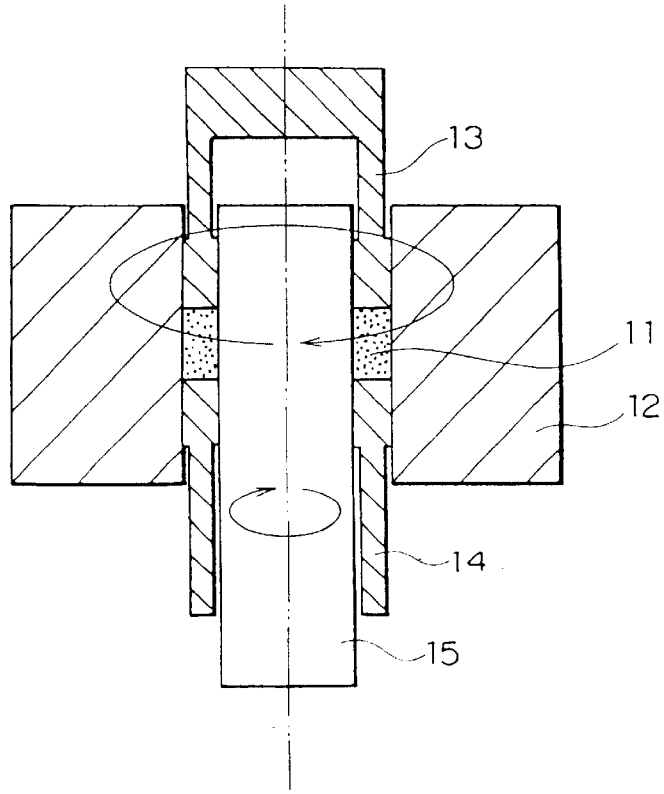
FIG. 6 is a diagram for explaining a third embodiment of the second manufacturing method of the present invention.
Figure 7:
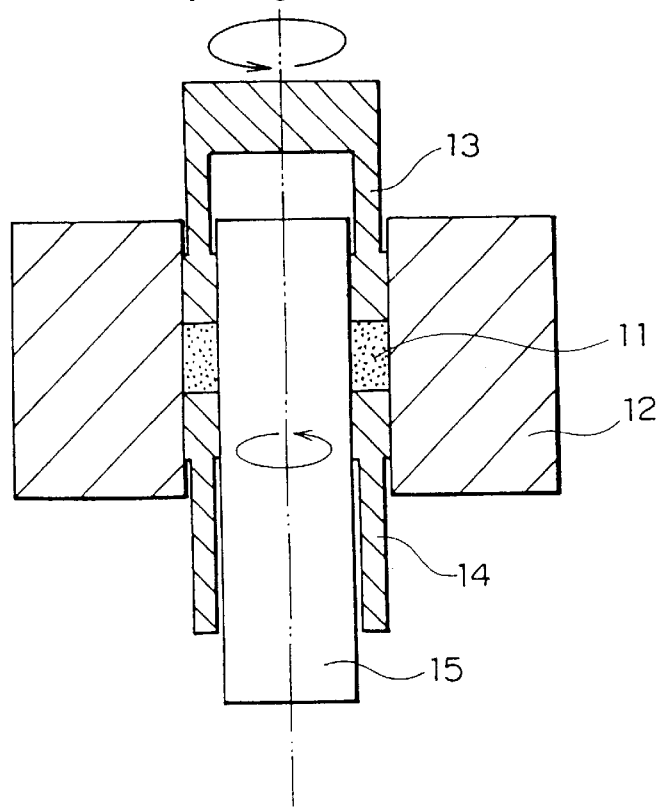
FIG. 7 is a diagram showing a modified example of the embodiment shown in FIG. 6.

Further, as shown in FIG. 6, the die 12 and the center punch 15 are rotated relatively with respect to the center axis so as to apply torsional stress, or as shown in FIG. 7, the upper punch 13 (or lower punch 14) and the center punch 15 are rotated relatively with respect to the center axis so as to apply torsional stress. Such steps of pressing are effective in forming a ring of magnet of which thickness in a direction of diameter is smaller than the height thereof, or a cylinder of magnet.

Figure 8:
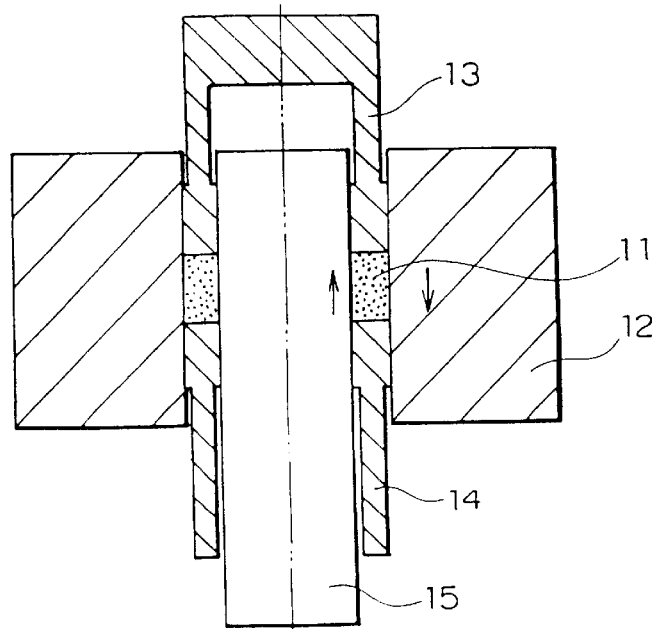
FIG. 8 is a diagram for explaining a fourth embodiment of the second manufacturing method of the present invention.

As shown in FIG. 8, the die 12 and center punch 15 may be relatively reciprocated in a direction parallel to the center axis. Such a step of pressing is effective in forming a ring of magnet of which thickness in a direction of diameter is smaller than the height thereof or a cylinder of magnet.

An angle of rotation of the aforementioned punch or die needs only to be set at 1° or more. A rotation of 360° or more, that is a plurality of rotations of the punch and die within a period of press is also permissible. During the press period, a direction of rotation of the punch and die may be reversed to compress, followed by repetition of further reversal. The control of press conditions of (B) exhibits a further effect when combined with the control of conditions of (A).

Next, the control of press conditions of (C) will be described in detail. That is, in a state where the pressure is applied to the mixture of the magnet material and binder, a temperature is raised up to one capable of curing the resin used as the binder. Thereby, the lowering of the density due to the spring back or the like of the magnet material can be suppressed. The control of press conditions of (C) can be combined with the condition controls of (A) and (B) to use. In implementing as small as possible improvement of the press machine to suppress an increase of manufacturing costs accompanying therewith, it is desirable to apply the controls of press conditions of (A) and (B).

In manufacturing the bond magnet of the present invention, means for densifying the density are not restricted to the aforementioned controls of press conditions of (A) to (C). Various kinds of methods capable of suppressing the spring back due to thinness of the magnet material can be applied. For instance, by lengthening the press time of one step, the density of the bond magnet can be increased. In this case, though the conditions are set considering the pressure, the concrete press time is preferable to be set between 5 seconds and 10 minutes, further preferable to be between 10 seconds and 8 minutes. Due to such a long time press step, even the magnet material around the center of the molded body is caused to break down to homogenize the pressure distribution inside the molded body, resulting in an increase of the density of the molded body.

Further, the resin, when pressed in a state where a temperature in the mold is raised up to a melting temperature (softening temperature) or more of the resin based binder, is increased in its fluidity to enable to sufficiently transfer the pressure. Thereby, the spring back is caused to occur with difficulty. For instance, powder of the magnet material is compounded together with thermoplastic resin such as nylon system or polyethylene terephthalate to prepare a sample. The compounded sample is molded under pressure in a state where the temperature in the mold is raised up to the melting temperature of the resin or more. Thereafter, the sample is cooled in the mold to form a bond magnet of high density. In this case, the powder of magnet material is preferable to be one in which particles of a length of 5 mm or less and of a thickness in the range of 10 to 30 $\mu$m occupy 60% or more from a viewpoint of densification.

After filling the mixture of the magnet material and binder in the forming mold, by applying preceding the press forming supersonic vibration to densify a state inside the material, densification of the molded body can be accomplished. Further, means of pulverizing the powder during compression molding, or means of applying instantaneous shock such as for instance in explosive forming can be applied to densify.

In the case of thermosetting resin such as epoxy-based resin being used as the binder, after implementing the aforementioned step of compression molding, a step of curing is preferable to implement at a temperature of approximately 100 to 200° C.

According to the aforementioned manufacturing methods of the present invention, the bond magnet of high density can be manufactured with magnet material of which principal phase is $TbCu_7$ type crystal phase that is difficult to densify. That is, even in this case as mentioned above, the density of molded body of $6.0 \times 10^3$ kg/m$^3$, further that exceeding $6.1 \times 10^3$ kg/m$^3$ can be realized with reproducibility. That is, in the case of flake (or thin ribbon) of magnet material that is prepared through quenching being used, the aforementioned friction or spring back between magnet materials can be causes of hindrance in densification. However, according to the present manufacturing methods, these causes can be cancelled to enable a further improvement of the density of the molded body.

The present manufacturing methods of bond magnet, as mentioned above, can be applied to various kinds of magnet materials such as Nd—Fe—B system magnet material and rare earth system magnet materials of which principal phase is one of $Th_2Ni_{17}$, $Th_2Zn_{17}$, $ThMn_{12}$ type crystal phases or the like. According to the present invention, the bond magnet using various kinds of magnet materials can be densified. In particular, the present invention is effective in densifying the bond magnet that uses the flake of magnet material of a thickness of less than 200 $\mu$m prepared by use of quenching method, further the flake of magnet material of which thickness is in the range of 5 to 50 $\mu$m.

The present bond magnets or the bond magnets obtained by the present manufacturing methods can be used in various kinds of electrical appliances such as motors, measuring instruments or the like. In particular, these are suitable as components of various motors in which smaller size and higher performance are demanded. As examples, such as medium driving spindle motors used in HDDs, FDDs, CD-ROMs and DVDs, lens actuators for light pick-ups, motors for printers, pager motors for vibration generation of such as portable telephones, and actuators for automobile speed meters can be cited. The cylindrical bond magnets are effective as thin, high performance speaker magnets of instruments that are made thinner and lighter such as portable telephones.

Figure 9:
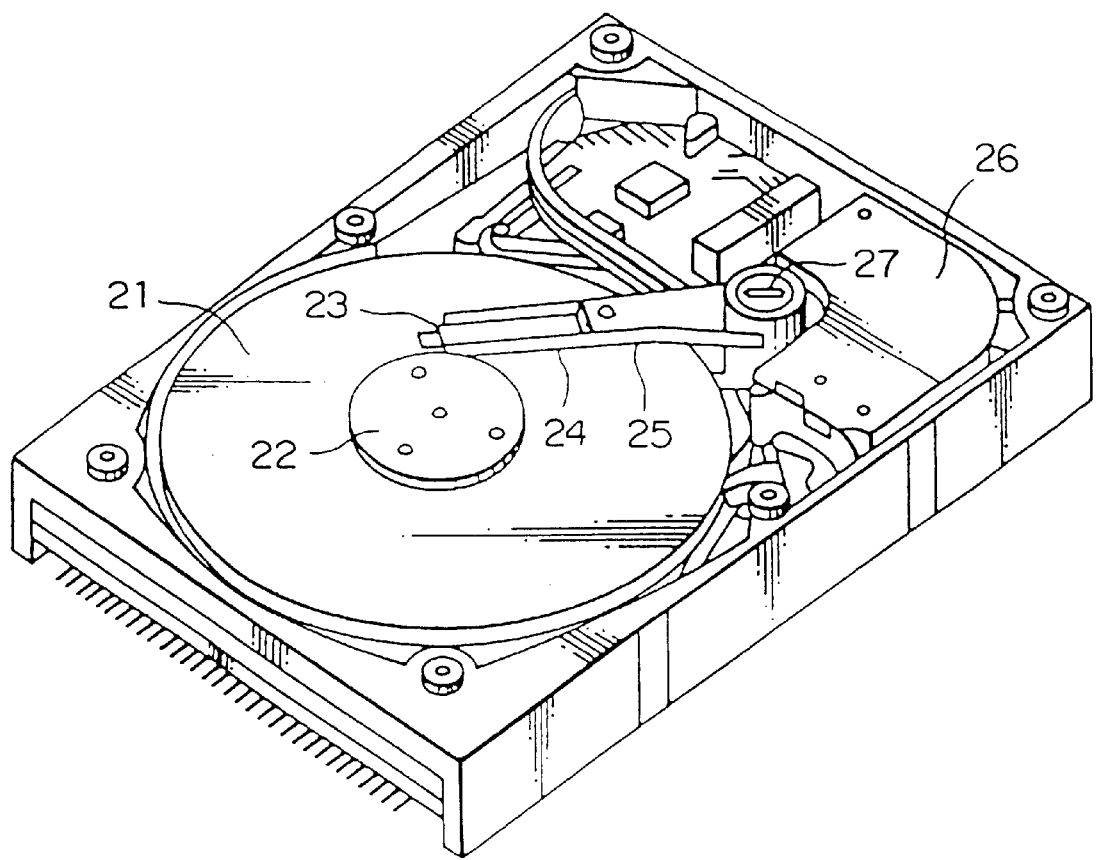
FIG. 9 is a diagram of one example of constitution of a hard disk drive (HDD) that comprises a spindle motor using the bond magnet of the present invention as a medium driving motor.

An actuator of the present invention comprises the bond magnet of the present invention such as described above. FIG. 9 is a diagram showing one constitution example of a hard disk drive (HDD) that has a motor (spindle motor in specific) comprising a rotor (or stator) having the present bond magnet as a motor for driving a recording medium (magnetic disk).

A magnetic disk 21 is mounted to a spindle of a spindle motor 22. The spindle motor 22 comprises a cylinder having the present bond magnet as for instance a rotor, the spindle being fixed to the rotor. The bond magnet constituting the cylinder is magnetized, along a direction of an arc thereof, in N and S poles in turn. Inside the cylinder an electromagnet is disposed as a stator, by switching N and S poles of the electromagnet the rotor being rotated due to an action of magnetic force. Together with the rotor the spindle rotates, thereby the magnetic disk 21 being rotated.

The bond magnet can be applied without restricting to the rotor. With the cylinder or the like having the present bond magnet as a stator, the electromagnet may be used as a rotor. These are identical with the ordinary motor structure.

A magnetic head for writing/reading information to and from the magnetic disk 21 is formed at the tip end of a head slider 23. The head slider 23 is attached to the tip end of a thin film of suspension 24. The suspension 24 is connected to one end of an actuator arm 25. To the other end of the actuator arm 25, a voice coil motor 26 that is a kind of a linear motor is disposed.

The voice coil motor 26 is constituted of a not shown driving coil wound up to a bobbin portion of the actuator arm 25 and a magnetic circuit consisting of a permanent magnet and counter yoke disposed facing to each other so as to sandwich the driving coil. For these, the present bond magnets can be applied. The actuator arm 25 is supported by ball bearings (not shown in the figure) disposed at two positions of above and below a fixed axis 27, being free in sliding/rotating due to the voice coil motor 26.

The aforementioned spindle motor 22, due to the use of the present bond magnet excellent in magnetic properties such as residual magnetization and the maximum magnetic energy product as mentioned above, is realized to be further smaller in size and further higher in performance. Further, by the use of such the spindle motor 22 as a driving motor of the magnetic disk 21, the HDDs or the like can be made smaller in size and higher in performance.

Next, specific embodiments of the present invention will be explained.

Embodiment 1

First, the respective raw materials of high purity are compounded according to a prescription, being melted by high frequency in an atmosphere of Ar to prepare an ingot of master alloy. Next, the ingot of master alloy is melted in an atmosphere of Ar by use of high frequency induction heating. The molten alloy is ejected from a nozzle onto a cooling roll rotating with a peripheral speed of 45 m/s to quench, thereby a ribbon of alloy being prepared. A thickness of the ribbon is 12 to 14 $\mu$m. The thickness is measured with a ballpoint micrometer.

Subsequently, the aforementioned ribbon of alloy is heat-treated in an atmosphere of Ar at a temperature of 760° C. for 60 minutes. Upon analyzing the heat-treated ribbon of alloy by use of X-ray diffraction, with the except of only a small amount of diffraction peaks due to α-Fe phase, all other peaks are confirmed to be capable of indexing to a $TbCu_7$ type crystal type structure. Next, the ribbon of alloy, after being pulverized to flakes of an average grain diameter of approximately 100 $\mu$m, is heat-treated in an atmosphere of nitrogen gas of 101 kPa (one atmospheric pressure) under the conditions of 450° C.×50 hours, thereby forcing to absorb nitrogen to form magnet material.

The aforementioned magnet material, as a result of chemical analysis, is confirmed to have a composition of $Sm_7Zr_3Co_4B_1N_{15}Fe_{bal}$. ($\{(Sm_{0.7}Zr_{0.3})_{0.12}B_{0.01}(Fe, Co)_{0.87}\}_{0.85}N_{0.15}$. By serving the magnet material with TEM, an average grain diameter of the principal phase and a volume ratio of the soft magnetic phase consisting of FeCo are investigated. As a result, the average grain diameter of the principal phase is 21 nm and the volume ratio of the soft magnetic phase is approximately 5%.

To the magnet material thus obtained, 2% by mass of epoxy resin is added as binder, followed by mixing. Thereafter, the mixture is set on a hydraulic press machine to implement compression molding after the following procedures. First, (1) pressure of $10 \times 10^2$ MPa is applied.

Subsequently, (2) the pressure is lowered to $0.5 \times 10^2$ MPa. The combined procedures of (1) and (2) are repeated five times. Thereafter, the pressure is decreased to zero to take out a molded body. The molded body is cured at a temperature of 150° C. for 2.5 hours to obtain an intended bond magnet. The obtained bond magnet is measured of density, residual magnetization, coercive force and maximum magnetic energy product. The results are shown in Table 1.

Further, as a comparative example of the present invention, with the exception of after the aforementioned mixture of the magnet material and binder is formed (only one time application of pressure) under the pressure of $10 \times 10^2$ MPa, the pressure being reduced to zero to take out the molded body, identical with the aforementioned embodiment 1, a bond magnet is produced. The bond magnet of the comparative example 1 is also measured of density, residual magnetization, coercive force and maximum magnetic energy product. The results are together shown in Table 1.

TABLE 1

|  | Embodiment 1 | Comparative Example 1 |
| --- | --- | --- |
| Density (kg/m³) | $6.12 \times 10^3$ | $5.94 \times 10^3$ |
| Residual Magnetization (T) | 0.79 | 0.77 |
| Coercive Force (kA/m) | 765 | 765 |
| Maximum Magnetic Energy Product (kJ/m³) | 101 | 95 |

As obvious from Table 1, the bond magnet of embodiment 1 possesses the density of $6.0 \times 10^3$ kg/m³ or more. Accompanying this, compared with the bond magnet of comparative example 1 using the same magnet material, the residual magnetization and maximum magnetic energy product are increased.

Embodiment 2

In the step of compression molding the aforementioned bond magnet of embodiment 1, with the exception of repetition times of the procedures (1) and (2) being set at the numbers shown in Table 2, identical with embodiment 1, the bond magnets are produced respectively. Each bond magnet is measured of the density. These results are shown together in Table 2.

TABLE 2

|  | Number of Repetition of Combination of (1) and (2) | Density (kg/m³) |
| --- | --- | --- |
| Comparative Example 2 | 1 | $5.94 \times 10^3$ |
| Embodiment 2 | 2 | $6.02 \times 10^3$ |
|  | 3 | $6.06 \times 10^3$ |
|  | 5 | $6.12 \times 10^3$ |
|  | 10 | $6.19 \times 10^3$ |
|  | 15 | $6.22 \times 10^3$ |

As shown in Table 2, as the number of repetition of the combined procedures of (1) and (2) is increased, the density of the bond magnet shows a tendency to increase. In particular, more than five times of repetitions can further improve the density of the bond magnet.

Embodiments 3 to 10, Comparative Examples 3 to 4

In the identical way with embodiment 1, an ingot of Sm—Zr—(Fe, Co)—B system master alloy is melted.

Thereafter, the molten alloy is ejected from a nozzle onto a cooling roll rotating with a peripheral speed of 35 m/s to quench, thereby ribbons of alloy being produced. Thicknesses of the ribbons are 15 to 17 μm. Further, as comparative examples 3 and 4, ribbons of alloy of a thickness of 300 μm are produced with a roll peripheral speed of 1 m/s.

Subsequently, the aforementioned ribbons of alloy each is heat-treated in an atmosphere of Ar at 700° C. for 30 minutes. The heat-treated ribbons of alloy, due to X-ray diffraction analysis, are confirmed for all diffraction peaks to be indexed to the $TbCu_7$ crystal structure. Then, these ribbons of alloy are heat-treated in a flow of gas mixture (ratio of amounts of flow: $NH_3:H_2=1:10$) of $NH_3$ and $H_2$ under conditions of 420 C.×3 hours to introduce nitrogen, thereafter being heat-treated at the same temperature for two hours in an atmosphere of nitrogen to form magnet material.

The aforementioned magnet materials are confirmed due to chemical analysis to have compositions of $\{(Sm_{0.75}Zr_{0.25})_{0.100}(Fe_{0.8}Co_{0.2})_{0.885}B_{0.015}\}_{0.84}N_{0.16}$ for embodiments and $\{(Sm_{0.75}Zr_{0.25})_{0.10}(Fe_{0.8}Co_{0.2})_{0.89}B_{0.01}\}_{0.87}N_{0.13}$ for comparative examples. Further, in the magnet material of embodiments, according to TEM observation, an average grain diameter of the principal phase is 25 nm.

To each magnet material thus obtained, 2% by mass of epoxy resin is added as the binder, followed by mixing. Thereafter, the mixture is set on a hydraulic press machine to implement compression molding and curing with the identical procedures with embodiment 1. Now, the number of pressing is two and magnets are molded into shapes shown in Table 3 respectively. The shapes of the magnet are adjusted by changing the mold. Properties of the respective bond magnets are shown together in Table 3.

TABLE 3

| | Shape of Molded Body (mm) | | | | Density of Magnet ($kg/m^3$) | (BH) max (MGOe) |
|---|---|---|---|---|---|---|
| | External Diameter | Internal Diameter | Height | Height Thickness | | |
| Embodiment 3 | 10.0 | 4.0 | 2.0 | 0.67 | $6.20 \times 10^3$ | 14.5 |
| Embodiment 4 | 8.0 | 4.0 | 6.0 | 3.0 | $6.30 \times 10^3$ | 14.9 |
| Embodiment 5 | 6.0 | 3.0 | 6.0 | 4.0 | $6.32 \times 10^3$ | 15.1 |
| Embodiment 6 | 5.0 | 2.5 | 6.0 | 4.8 | $6.30 \times 10^3$ | 15.0 |
| Embodiment 7 | 4.0 | 2.0 | 6.0 | 6.0 | $6.40 \times 10^3$ | 15.4 |
| Embodiment 8 | 2.0 | 1.0 | 4.0 | 8.0 | $6.45 \times 10^3$ | 15.7 |
| Embodiment 9 | 1.0 | 0.5 | 5.0 | 20.0 | $6.16 \times 10^3$ | 14.0 |
| Embodiment 10 | 0.8 | 0.2 | 4.0 | 13.3 | $6.45 \times 10^3$ | 15.5 |
| Comparative Example 3 | 15.0 | 5.0 | 5.0 | 1.0 | $6.41 \times 10^3$ | 9.9 |
| Comparative Example 4 | 18.0 | 14.0 | 45.0 | 22.5 | $6.35 \times 10^3$ | 9.5 |

As obvious from Table 3, the present bond magnets are confirmed to have large maximum magnetic energy products. The bond magnets of comparative examples 3 and 4, in spite of high densities thereof, show poor properties as the bond magnet due to poor characteristics of the magnet material. Embodiments 11 to 19, Comparative Examples 5 to 8.

In the identical way with embodiment 1, an ingot of Sm—Zr—(Fe, Co)—B system master alloy, after being melted, is ejected onto a cooling roll rotating with a peripheral speed of 30 m/s to quench, thereby ribbons of alloy of embodiments 11 to 16 being prepared. The thicknesses thereof are 18 to 20 μm. In addition, as comparative examples 5 to 8, in the identical way except implementing with Sm—(Fe, Co) system master alloy, ribbons of alloy are prepared. Further, with a twin roll and a peripheral speed of 20 m/s, the molten alloy of the same composition with that of embodiments 11 to 16 is quenched to produce flakes of alloy (Embodiments 17 to 19) of a thickness of 45 μm.

Subsequently, ribbons of alloy and flakes of alloy each is heat-treated in an atmosphere of Ar at 720° C. for 40 minutes. The heat-treated ribbons of alloy, due to X-ray diffraction analysis, are confirmed all the diffraction peaks thereof can be indexed to $TbCu_7$ type crystal structure. Then, the respective thin ribbons of alloy are heat-treated in an atmosphere in which a ratio of flow rates of $NH_3$ and $H_2$ is 1:15 under the conditions of 440° C.×3.5 hours to introduce nitrogen, followed by heat-treatment at the same temperature for two hours in an atmosphere of nitrogen to prepare magnet materials.

The aforementioned magnet materials, due to chemical analysis, are confirmed to have a composition of $\{Sm_{0.8}Zr_{0.2})_{0.10}(Fe_{0.8}Co_{0.2})_{0.88}B_{0.02}\}_{0.85}N_{0.15}$. The magnet materials the comparative examples are confirmed to have a composition of $\{Sm_{0.10}(Fe_{0.9}Co_{0.1})_{0.90}\}_{0.87}N_{0.13}$. Average grain diameters of the principal phases of embodiments 11 to 16 obtained from half-widths of X-ray diffraction patterns are 30 nm, those of embodiments 17 to 19 being 45 nm.

To each magnet material thus obtained, 2% by mass of epoxy resin is added as the binder, followed by mixing. Thereafter, the mixture is set on a hydraulic press machine to compression-mold and cure as identical with the procedures of embodiment 1. In this case, the number of pressing is twice and the shapes of the magnets are as shown in Table 4. The shape of the magnet is adjusted by changing the mold. The properties of the respective magnets are shown together in Table 4.

TABLE 4

| | Shape of Molded Body | | Density of Magnet ($kg/m^3$) | (BH) max (MGOe) |
|---|---|---|---|---|
| | External Diameter (mm) | Height (mm) | | |
| Embodiment 11 | 16 | 1.5 | $6.35 \times 10^3$ | 14.5 |
| Embodiment 12 | 25 | 2.5 | $6.43 \times 10^3$ | 14.9 |
| Embodiment 13 | 10 | 1.0 | $6.48 \times 10^3$ | 15.1 |
| Embodiment 14 | 8 | 1.0 | $6.45 \times 10^3$ | 15.0 |
| Embodiment 15 | 5 | 1.0 | $6.52 \times 10^3$ | 15.4 |
| Embodiment 16 | 3 | 1.0 | $6.45 \times 10^3$ | 15.0 |
| Embodiment 17 | 10 | 1.0 | $6.50 \times 10^3$ | 14.7 |
| Embodiment 18 | 5 | 1.0 | $6.48 \times 10^3$ | 14.5 |
| Embodiment 19 | 3 | 1.0 | $6.52 \times 10^3$ | 14.8 |
| Comparative Example 5 | 30 | 5.0 | $5.91 \times 10^3$ | 11.0 |
| Comparative Example 6 | 30 | 10.0 | $5.85 \times 10^3$ | 8.8 |
| Comparative Example 7 | 25 | 5.0 | $5.95 \times 10^3$ | 9.2 |
| Comparative Example 8 | 30 | 0.5 | $5.68 \times 10^3$ | 8.0 |

As obvious from Table 4, the present bond magnets are confirmed to have large maximum magnetic energy products. On the other hand, the bond magnets of comparative examples 5 to 8 are confirmed to be poor in properties.

Embodiments 20 to 23

In the identical way with embodiment 1, an ingot of Sm—Zr—(Fe, Co)—B system master alloy is melted. Thereafter, the molten alloy is ejected from a nozzle onto a cooling roll rotating with a peripheral speed of 40 m/s to quench, thereby ribbons of alloy being produced. Thicknesses of the ribbon are 14 to 16 μm.

Subsequently, the aforementioned ribbons of alloy each is heat-treated in an atmosphere of Ar at 700° C. for 60 minutes. The heat-treated thin ribbons of alloy, due to X-ray diffraction analysis, are confirmed all diffraction peaks can be indexed to the TbCu$_7$ crystal structure. Then, these ribbons of alloy are heat-treated in an atmosphere in which a ratio of flow rates of NH$_3$ and H$_2$ is 1:20 under conditions of 440° C.×4 hours to introduce nitrogen, thereafter being heat-treated at the same temperature for two hours in an atmosphere of nitrogen to form magnet materials.

The aforementioned magnet materials are confirmed due to chemical analysis to have a composition of $\{(Sm_{0.65}Zr_{0.35})_{0.400}(Fe_{0.8}Co_{0.2})_{0.885}B_{0.015}\}_{0.87}N_{0.13}$. Further, from TEM observation, an average grain diameter of the principal phase is confirmed to be 18 nm.

To each magnet material thus obtained, 2% by mass of epoxy resin is added as the binder, followed by mixing. Thereafter, the mixture is set on a hydraulic press machine to implement compression molding according to the following procedures. Then, the respective magnets, after curing, are measured of magnetic properties. The results are shown in Table 5. The shape of the molded body is a ring of an external diameter of 5 mm, an internal diameter of 2.5 mm, and a height of 3 mm.

Press Conditions

Embodiment 20: With the pressure of 10×10$^2$ MPa, being pressed for 1 minute.
Embodiment 21: With the pressure of 10×10$^2$ MPa, a die being rotated by 360° in a minute.
Embodiment 22: With the pressure of 10×10$^2$ MPa, a die being rotated by 180° in a minute.
Embodiment 23: With the pressure of 10×10$^2$ MPa, a punch repeating a 45° rotation and counter rotation three times a minute.

TABLE 5

|  | Density of Magnet (kg/m$^3$) | (BH) max (MGOe) |
|---|---|---|
| Embodiment 20 | 6.23 × 10$^3$ | 14.7 |
| Embodiment 21 | 6.34 × 10$^3$ | 15.2 |
| Embodiment 22 | 6.40 × 10$^3$ | 15.6 |
| Embodiment 23 | 6.45 × 10$^3$ | 15.9 |

As obvious from Table 5, the present bond magnets are confirmed to have higher densities and larger maximum magnetic energy products.

Embodiment 24

To magnet material prepared under the identical conditions with embodiment 1, 2% by mass of epoxy resin is added as the binder, followed by mixing. The mixture is set on a hydraulic press machine having a mechanism that rotates the upper punch 13 and lower punch 14 shown in FIG. 4.

Then, while gradually applying pressure onto the mixture 11 with a speed of 1×10$^2$ MPa a minute, as shown in FIG. 4, the upper and lower punches 13 and 14 are rotated reciprocating in the directions opposite to each other. At a point of time when the pressure of 2×10$^2$ MPa is reached, the upper and lower punches 13 and 14 are stopped rotating to apply pressure of 10×10$^2$ MPa. The compression-molded body is taken out, followed by curing in standard way. The density thereof is 6.21×10$^3$ kg/m$^3$. The molded body has a shape of an external diameter of 16 mm and a thickness of 1.5 mm.

As a comparative example of the present invention, with the only exception of not rotating the upper and lower punches 13 and 14 during pressing, in the identical way, the bond magnet is produced. The density of the molded body of the bond magnet is 5.73×10$^3$ kg/m$^3$.

Embodiment 25

To magnet material prepared under the identical conditions with embodiment 1, 2% by mass of epoxy resin is added as the binder, followed by mixing. The mixture is set on a hydraulic press machine having a mechanism that rotates the upper punch 13 shown in FIG. 5.

Then, while gradually applying pressure onto the mixture 11 with a speed of 1×10$^2$ MPa a minute, as shown in FIG. 5, the upper punch 13 is rotated reciprocating with respect to the die 12. At a point of time when the pressure of 2×10$^2$ MPa is reached, the upper punch 13 is stopped rotating to apply pressure of 10×10$^2$ MPa. The compression molded body is taken out to cure in standard way. The density thereof is 6.09×10$^3$ kg/m$^3$. The molded body has a shape of an external diameter of 20 mm, an internal diameter of 18 mm and a thickness and height of ring portion of 1.5 mm and 5 mm, respectively.

As a comparative example of the present invention, with the only exception of not rotating the upper punch during press, in the identical way the bond magnet is produced. The density of the molded body of the bond magnet is 5.75×10$^3$ kg/m$^3$.

Embodiment 26

To the magnet material prepared under the identical conditions with embodiment 1, 2% by mass of epoxy resin is added as the binder, followed by mixing. The mixture is set on a hydraulic press machine having a mechanism that rotates the center punch 15 shown in FIG. 6.

Then, while gradually applying pressure onto the mixture 11 with a speed of 1×10$^2$ MPa a minute, as shown in FIG. 6, the center punch 15 is rotated reciprocating with respect to the die 12. At a point of time when the pressure of 2×10$^2$ MPa is reached, the center punch 15 is stopped rotating to apply pressure of 10×10$^2$ MPa. The compression-molded body is taken out to cure in standard way. The density thereof is 6.05×10$^3$ kg/m$^3$. The molded body has a ring shape of an external diameter of 5 mm, an internal diameter of 2 mm and a thickness and height of the ring portion of 1.5 mm and 5 mm, respectively.

As a comparative example of the present invention, with the only exception of not rotating the center punch during press, in the identical way the bond magnet is produced. The density of the molded body of the ring of bond magnet is 5.51×10$^3$ kg/m$^3$.

Embodiment 27

To magnet material prepared under the identical conditions with embodiment 1, 2% by mass of epoxy resin is added as the binder, followed by mixing. The mixture is set on a hydraulic press machine having a mechanism that reciprocates up and down the center punch 15 shown in FIG. 8.

Then, while gradually applying pressure onto the mixture 11 at a speed of $1\times10^2$ MPa a minute, as shown in FIG. 8, the center punch 15 is reciprocated in a direction parallel with a central axis. At a point of time when the pressure of $3\times10^2$ MPa is reached, the center punch 15 is stopped moving to apply the pressure of $10\times10^2$ MPa. The compression-molded body is taken out to cure in standard way. The density thereof is $6.30\times10^3$ kg/m$^3$. The molded body has a cylinder shape of an external diameter of 3 mm, an internal diameter of 1 mm, a thickness of 1 mm and a height of 10 mm.

As a comparative example of the present invention, with the only exception of not reciprocating the center punch during press, in the identical way a ring of the bond magnet is produced. The density of the molded body of the ring of bond magnet is $5.63\times10^3$ kg/m$^3$.

Embodiment 28

To the magnet material prepared under the identical conditions with embodiment 1, 2% by mass of epoxy resin is added as the binder, followed by mixing. The mixture is set on a hydraulic press machine to apply pressure of $10\times10^2$ MPa. While maintaining the applied pressure, the temperature of an entire mold is raised up to a curing temperature of the resin to cure. After cooling, the bond magnet is taken out to measure the density, the density being $6.25\times10^3$ kg/m$^3$.

As a comparative example of the present invention, without raising the temperature of the mold during press, the molded body is taken out to cure in the standard way, thereby a bond magnet is produced. The density of the molded body of the bond magnet is $5.63\times10^3$ kg/m$^3$.

Embodiment 29

To magnet powder (Sm—Zr—(Fe, Co)—B—N system magnet powder) prepared under the identical conditions with embodiment 3, 15% by mass of nylon 12 is added as the binder to knead, compound being prepared. In the magnet powder, particles of a length of 5 mm or less occupies 70% by volume, an average thickness being 17 $\mu$m. These values are obtained by sieving and calculation based on weights.

The aforementioned compound is put in a mold of a hydraulic press machine, the temperature of the mold is set at 220° C., and pressure of 500 MPa is applied. While maintaining the applied pressure, the entire mold is cooled to the room temperature, thereafter the bond magnet is taken out from the mold. The shape of the magnet is an external diameter of 5 mm, an internal diameter of 2 mm and a height of 6 mm. The density of the obtained bond magnet is $6.40\times10^3$ kg/m$^3$, (BH)max being 15.4 MGOe.

As obvious from the aforementioned embodiments, according to the present invention, even in the case of the magnet material of which principal phase is TbCu$_7$ type crystal phase being used, the bond magnet of which density of molded body is densified to $6\times10^3$ kg/m$^3$ or more can be obtained with good reproducibility. That is, the bond magnet excellent in magnetic properties such as the maximum magnetic energy product or the like and in corrosion resistance can be provided with good reproducibility.

While the present invention has been particularly shown and described with reference to preferred embodiments thereof, it will be understood by those skilled in the art that various changes in forms and detail may be made therein without departing from the spirit, scope and teaching of the invention. Accordingly, the invention herein disclosed is to be considered merely as illustrative and limited in scope only as specified in the appended claims.

What is claimed is:

1. A method for manufacturing a bond magnet, comprising:
   a step of compression molding a mixture of magnet material and binder into a desired magnet shape;
   wherein in the step of compression molding, pressure is applied a plurality of times to the mixture.

2. The method for manufacturing a bond magnet as set forth in claim 1:
   wherein in the step of compression molding, between a maximum pressure and a pressure of 90% or less of the maximum pressure, compression and decompression to the mixture are alternately repeated.

3. The method for manufacturing a bond magnet as set forth in claim 1:
   wherein the step of compression molding comprises a stage of applying a pressure of $6\times10^2$ MPa or more to the mixture and a stage of releasing a pressure by lowering to a pressure lower by $2\times10^2$ MPa than that of the stage of applying a pressure;
   wherein the stages of applying and releasing the pressure are repeated twice or more.

4. The method for manufacturing a bond magnet as set forth in claim 3:
   wherein the stages of applying and releasing pressure are repeated five times or more.

5. The method for manufacturing a bond magnet as set forth in claim 3:
   wherein in the stage of releasing pressure, the pressure is lowered to $2\times10^2$ MPa or less.

6. The method for manufacturing a bond magnet as set forth in claim 1:
   wherein in the step of compression molding, while at least one selected from a punch and die for compression molding is rotated or reciprocated, the pressure is applied to the mixture.

7. The method for manufacturing a bond magnet as set forth in claim 1:
   wherein the magnet material comprises rare earth element-iron-nitrogen as main component, TbCu$_7$ crystal phase as a principal phase and a shape of flake of a thickness of less than 200 $\mu$m, the binder being resin based binder.

8. The method for manufacturing a bond magnet as set forth in claim 7:
   wherein the flake of magnet material is formed by quenching method, the thickness thereof being in the range of 5 to 50 $\mu$m, and nitrogen is incorporated in the flake.

9. The method for manufacturing a bond magnet as set forth in claim 7:
   wherein in the step of compression molding, a molded body of which density is $6\times10^3$ kg/m$^3$ or more is produced.

10. A method for manufacturing a bond magnet, comprising:
   a step of compression molding a mixture of magnet material and binder into a desired shape of magnet;
   wherein in the step of compression molding, while at least one of a punch and die for compression molding is rotated, pressure is applied to the mixture.

11. The method for manufacturing a bond magnet as set forth in claim 10:
   wherein in the step of compression molding, while rotating upper and lower punches relatively with respect to a center-axis so as to apply torsional stress, pressure is applied to the mixture.

12. The method for manufacturing a bond magnet as set forth in claim 10:
   wherein in the step of compression molding, while rotating a die and a punch relatively with respect to a center axis so as to apply torsional stress, pressure is applied to the mixture.

13. The method for manufacturing a bond magnet as set forth in claim 10:
   wherein in the step of compression molding, while rotating a die and a center punch, or at least one of upper and lower punches and a center punch relatively with respect to a center axis so as to apply torsional stress, pressure is applied to the mixture.

14. The method for manufacturing a bond magnet as set forth in claim 10:
   wherein the magnet material comprises rare earth element-iron-nitrogen as main component, $TbCu_7$ crystal phase as a principal phase and a shape of flake of a thickness of less than 200 $\mu$m, the binder being resin based binder.

15. The method for manufacturing a bond magnet as set forth in claim 14:
   wherein the flake of magnet material is formed by quenching method, the thickness thereof being in the range of 5 to 50 $\mu$m, and nitrogen is incorporated in the flake.

16. The method for manufacturing a bond magnet as set forth in claim 14:
   wherein in the step of compression molding, a molded body of which density is $6 \times 10^3$ kg/m$^3$ or more is produced.

* * * * *